March 7, 1939.  R. J. KELBERER  2,149,296
VEHICLE APPLIANCE
Filed Nov. 1, 1937  3 Sheets-Sheet 1
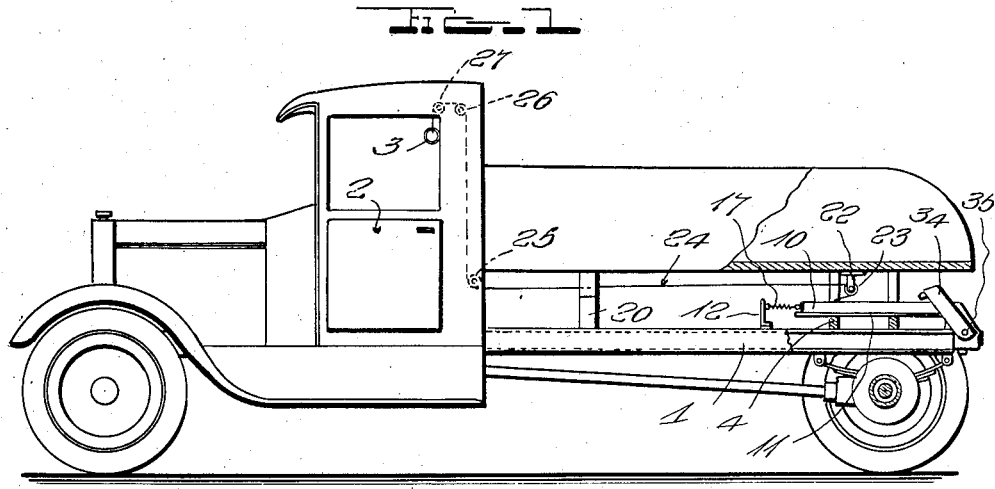
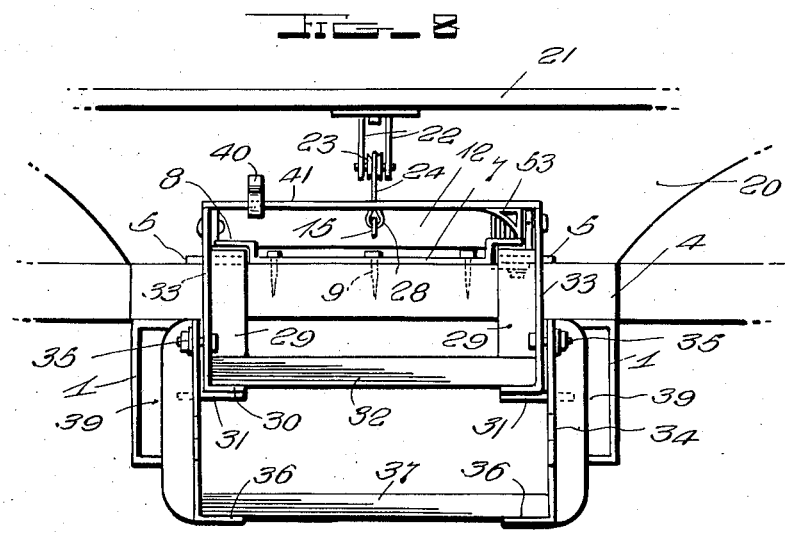
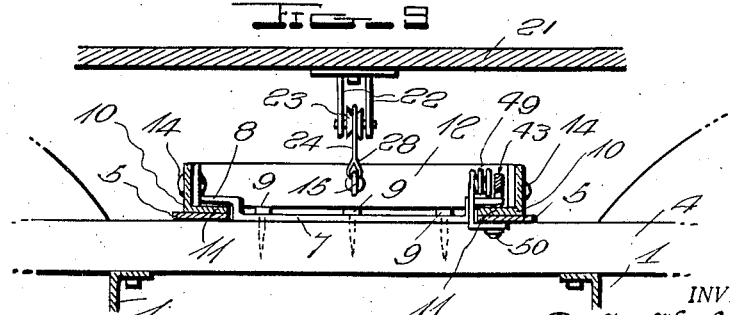
INVENTOR.
R. J. Kelberer,
BY John B. Brady
ATTORNEY.

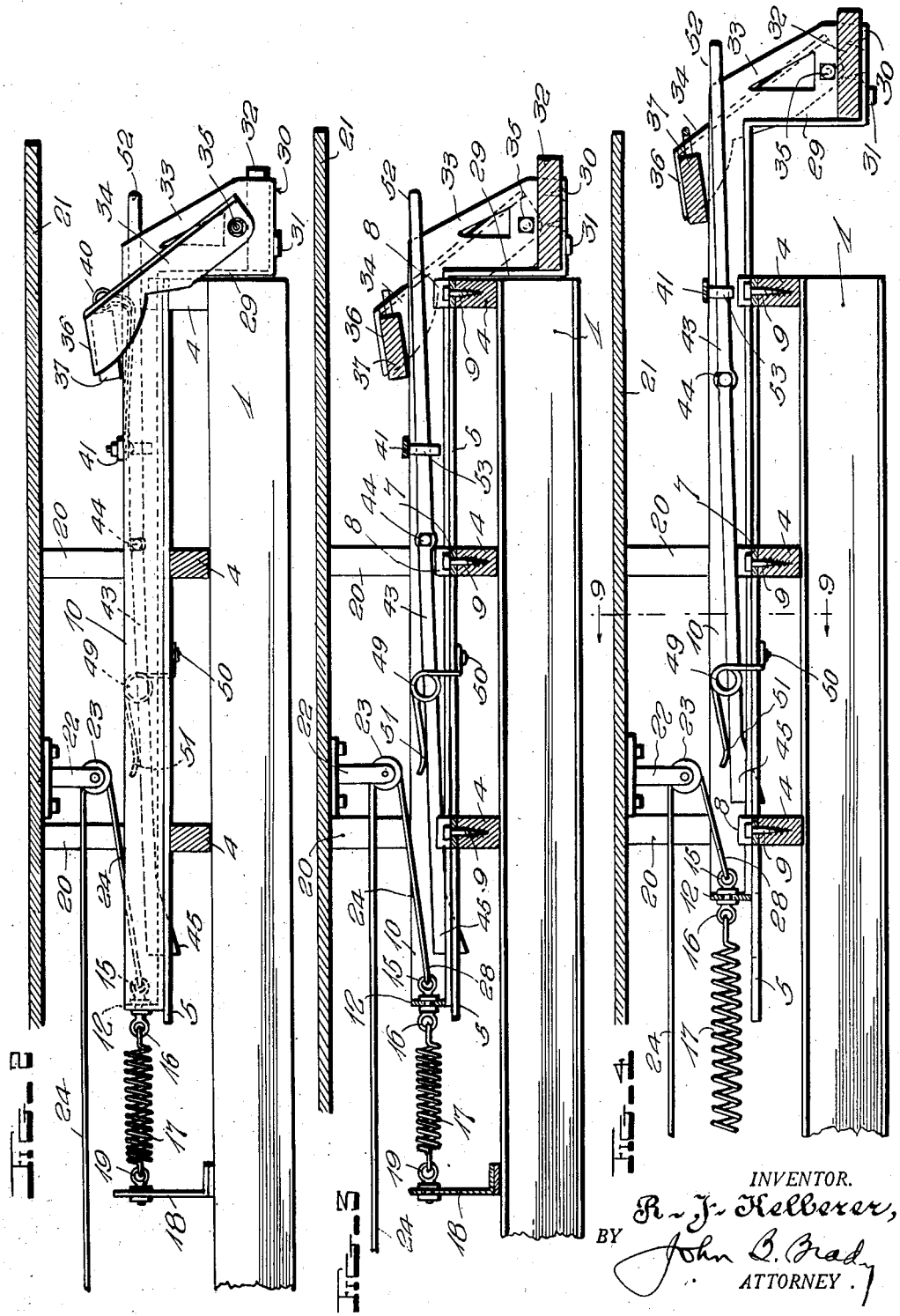

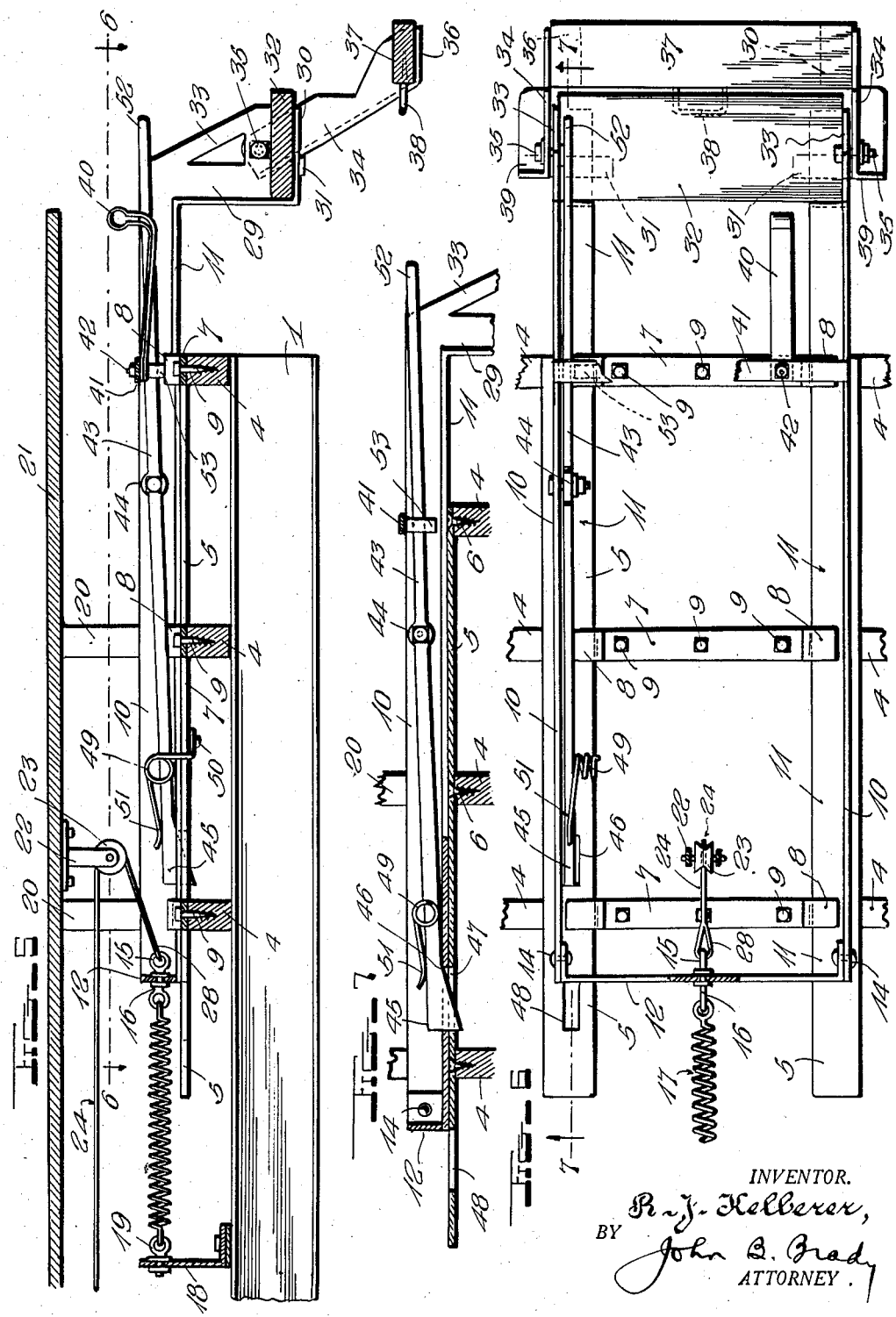

Patented Mar. 7, 1939

2,149,296

UNITED STATES PATENT OFFICE 2,149,296

VEHICLE APPLIANCE

Raymond J. Kelberer, Great Falls, Mont.

Application November 1, 1937, Serial No. 172,253

11 Claims. (Cl. 280—166)

My invention relates broadly to vehicles and more particularly to an appliance which may be installed on vehicles of various kinds to serve as a support, step or seat.

One of the objects of my invention is to provide a construction of appliance capable of being mounted on the chassis of a vehicle and normally housed beneath the chassis and capable of being projected from a control position within the vehicle when the appliance is to be used as a step, seat or other support.

Another object of my invention is to provide an attachment for vehicles whereby a step, seat or other support may be housed beneath the chassis of the vehicle and projected to a position beyond the limits of the chassis from a control position within the vehicle for rendering the appliance effective as a step, seat or other support.

Still another object of my invention is to provide a construction of appliance for vehicles in which a step, seat or other support is shiftable to either a projected position or a housed position with respect to the vehicle chassis and positively maintained in such positions, the ejecting means being operative from a postion within the vehicle structure.

A further object of my invention is to provide an arrangement of spring mechanism for positively maintaining an appliance such as a step, seat or other support in a housed position adjacent a vehicle chassis which is capable of being shifted to an operative position beyond the limits of the vehicle chassis in combination with spring actuated means for latching the appliance in operative position.

A still further object of my invention is to provide a construction of spring actuated latching means for maintaining a projectible appliance in ejected position with respect to a vehicle chassis adapted to be automatically restored to housed position by operation of the spring actuated latching means.

Another object of my invention is to provide a construction of appliance for use as a vehicle step, seat or other support including a slidable portion and a hinge portion, the hinge portion being adapted to be collapsed upon the slidable portion and the complete assembly shifted to a housed position beneath a vehicle chassis when the appliance is not in use.

Other and further objects of my invention reside in the combined slidable and hinged retractible appliance for vehicles as set forth more fully in the specification hereinafter following by reference to the accompanying drawings in which:

Figure 1 is a side view of a motor vehicle equipped with the improved auxiliary steps of my invention; Fig. 2 is a side elevation on an enlarged scale illustrating the steps in retracted and folded position with respect to the vehicle chassis; Fig. 3 is a similar view taken on a central, vertical, longitudinal section in the direction of the longitudinal axis of the vehicle chassis; Fig. 4 is a central, vertical, longitudinal view showing one of the steps projected beyond the limits of the vehicle chassis in a position for use; Fig. 5 is a similar view with an additional step swung down in position for use; Fig. 6 is a top plan view of the steps in the extended position shown in Fig. 5 looking in the direction of line 6—6, the pulley suspension and part of the slidable frame being shown in section; Fig. 7 is a longitudinal sectional view taken on line 7—7 of Fig. 6; Fig. 8 is a rear elevational view of the steps in projected position with respect to the vehicle chassis; and Fig. 9 is a transverse vertical section taken on line 9—9 of Fig. 4.

My invention is directed to an appliance for vehicles such as trailer coaches, motor trucks, buses, cars, automobiles and other vehicles whereby a step, seat or other support may be housed with respect to the chassis of the vehicle when the appliance is not in use and projected to an operative position by operation of a control within the vehicle when the appliance is to be shifted to operative position. The appliance includes both a slidable portion and a hinged portion. The hinged portion may be collapsed upon the slidable portion for enabling the appliance to be compactly housed with respect to the vehicle chassis. The appliance is spring controlled by a spring mechanism which normally urges the appliance to housed position with respect to the vehicle chassis. The control means operated from within the vehicle function to overcome the effectiveness of the spring mechanism for shifting the appliance to ejected position. I provide latching means automatically effective for latching the appliance in either the housed or projected position.

I have found the construction of my invention highly practical for manufacture and production and successful in use, and while I have described my invention in a prefered embodiment I realize that modifications of my construction may be made and I do not intend that my invention be limited to the specific construction which I have selected for purposes of illustrating my invention.

Referring to the drawings in detail, reference character 1 designates the chassis of a truck on which the appliance of my invention is installed. The control position of the truck is illustrated at 2 where I have conveniently located the control member 3 for controlling the ejection of the appliance from a housed position adjacent the chassis 1 to a projected position in which the appliance of my invention is effective. The chassis 1 supports a plurality of transversely extending beams 4 on which there is supported a pair of spaced rails 5 extending longitudinally with respect to the axis of the chassis. The rails 5 are secured in position with respect to the transversely extending beams 4 by means of fastening members 6 illustrated in Fig. 7. Laterally extending members 7, which are provided with right angular bends 8 at opposite ends thereof, extend over the flat portions 11 of angle members 10 constituting the slidable frame of the appliance of my invention. The members 7 are secured to the laterally extending beams 4 by means of fastening means 9 as shown.

The slidable frame 10 is interconnected at one end by means of transverse member 12 secured to opposite portions of frame 10 by suitable means such as rivets 14. The transverse member 12 is provided with a pair of eyelet devices which extend in opposite directions as indicated at 15 and 16. The eyelet device 16 is connected through coil spring 17 to eyelet 19, mounted in the support 18 attached to the chassis 1. The slidable frame 10 is accordingly constantly urged to a housed position with respect to the chassis 1, the path of movement of the frame 10 being confined in a longitudinal direction by the right angular bends 8 of members 7.

The floor 21 of the vehicle is supported with respect to the chassis 1 by suitable spacer members 20. A bracket 22 depends from the floor 21 in a position which allows control cable 24 to pass over pulley 23 and connect through loop 28 with eyelet 15. The position of the center line of pulley 23 is chosen so that when the appliance is shifted to projected position such as illustrated in Figs. 4 and 5, sufficient force may be applied to effect the ejection of frame 10 against the resistance offered by coil spring 17. The control cable 24 extends, as illustrated in Fig. 1, through guide pulleys 25, 26 and 27 to the control member 3 adjacent the control position of the truck. This allows the slidable frame 10 to be projected rearwardly from a position within the vehicle.

The angle members constitute the frame 10 for rearwardly depending portions 29 and 30. The flat portions of the angle members 10 are directed toward each other and serve as supports for the step 32. Beneath the depending portions of the angle members 10, illustrated at 30, I provide oppositely extending strip members 31 which serve as limiting stops for the hinged portion of the appliance which I have shown at 34. The depending and rearwardly projecting portions 29 and 30 of frame members 10 are connected by side plates 33 to which the hinged portion 34 is pivotally connected as indicated at 35. The hinged portion 34 comprises side plates having strengthening angular portions 39 directed outwardly and supporting angular portions 36 directed inwardly. The supporting portions 36 serve as carriers for the step 37. The outwardly projecting angular portions 39 strengthen the hinged sections 34 and also serve as abutment stops in contact with the abutments 31 as illustrated in Fig. 5. The rear of the step 37 is provided with a hook device 38 which allows the hinged portion of the appliance to be readily grasped and angularly shifted to collapsed position as illustrated in Figs. 1, 2, 3 and 4.

When shifted to collapsed position, the hinged portion of the appliance is maintained in collapsed position by engagement with resilient latch 40 illustrated in Figs. 2, 5, 6 and 8. The resilient latch 40 is supported transversely of frame 10 on member 41. Securing means 42 serve to fasten member 40 with respect to member 41.

In order to insure the latching of the appliance in either of the limiting positions thereof, that is, the projected position shown in Figs. 4 and 5, or the retracted position shown in Figs. 1, 2 and 3, I provide a spring actuated latching mechanism. A lever 43 is pivotally mounted at 44 on the slidable frame 10. One end of the lever 43 is broadened at 45 to provide an engaging portion engageable through the relatively short slot 46 in the flat portion 11 in one of the angle members constituting frame 10 with either of the relatively short slots 47 or 48 in the coacting rail 5. A spring member shown at 49 has one end 50 secured to the lower portion of rail 5 and the opposite end 51 slidably engageable with the end of lever 43 continuously tending to urge the end 45 of lever 43 into engagement with either slot 47 or 48 through slot 46. One side of the broadened end 45 of lever 43 is inclined and serves as a cam face which readily rides out of slot 48 when the frame 10 is projected under control of cable 24 and against the action of spring 17. However, the end abutment formed by lever 43 prevents the frame from moving to a housed position until the lever 43 is manually actuated. The manual release is effected by grasping the end 52 of the lever 43 and shifting the lever downwardly. A bracket 53 supported by transverse member 41, shown more clearly in Fig. 8, serves to limit the lateral displacement of lever 43 while allowing lever 43 adequate up and down movement for releasing the end 45 from slot 47 against the action of spring 49. This allows the slidable carriage of frame 10 to snap back into housed position under control of spring 17. Lever 43 is yieldably engaged by spring 49 so that the end 45 of the lever continuously seeks a position in either of the slots 47 or 48 so that the carriage or frame is locked in either of its limited positions against accidental displacement. As heretofore noted, the positive transitory force imparted to the carriage of frame 10 by operation of control cable 24 is sufficient to dislodge the end of the latch at 45 from slot 48 in projecting the carriage or frame 10. As soon as the carriage or frame 10 slides to a position in which a slot 46 registers with slot 47, the end of the latch 45 falls into engagement with slot 47 thereby maintaining the carriage or frame 10 in projected position until the lever 43 is manually actuated by grasping and shifting the end 52.

When the hinge portion 34 is moved to collapsed position, the entire assembly is extremely compact and can be readily housed beneath the chassis.

As heretofore observed, I have described my invention in one of its preferred embodiments for the purpose of illustrating my invention and without intending to limit the same. No limitations upon my invention are intended other than may be imposed by the scope of the appended claims.

What I claim as new and desire to secure by Letters Patent of the United States is as follows:

1. A vehicle appliance comprising a frame horizontally supported with respect to the chassis of a vehicle and slidable from a position within the limits of the vehicle chassis to a position projecting beyond the limits of the vehicle chassis, and means carried by said frame and manually controllable with said frame in projected position for latching said frame in either of the extreme positions thereof.

2. An appliance for vehicles comprising in combination with a vehicle chassis, a horizontal frame slidably supported with respect to the chassis, spring means for normally restraining the frame in a position within the limits of the chassis, means for projecting said frame to a position beyond the limits of said chassis, and means for latching said frame in projected position, the last said means being carried by said frame and manually controllable with said frame in projected position for releasing said frame for retraction by said spring means.

3. A vehicle appliance comprising in combination with a vehicle chassis, a slidable frame horizontally supported with respect to the vehicle chassis, spring means normally restraining said slidable frame in a position within the limits of the chassis, means opposing the operation of said spring means for projecting said slidable frame to a position beyond the limits of the chassis, said frame having a fixed depending portion on the end thereof which is adapted to be projected beyond the limits of said chassis, a supporting member carried by the depending end of said frame in a horizontal plane spaced below the plane of said frame, and means for latching said frame in either of the extreme limits of movement thereof.

4. A vehicle appliance comprising in combination with a vehicle chassis, a slidable frame horizontally supported with respect to the vehicle chassis, spring means normally restraining said slidable frame in a position within the limits of the chassis, means opposing the operation of said spring means for projecting said slidable frame to a position beyond the limits of the chassis, said frame having a fixed depending portion on the projectible end thereof, a support carried by the depending end of said frame in a horizontal plane spaced below the plane of said frame, and an auxiliary support hingedly connected with the depending end of said frame and movable from a position beneath said first mentioned support to a position above said frame.

5. A vehicle appliance comprising in combination with a vehicle chassis, a slidable frame horizontally supported with respect to the vehicle chassis, spring means normally restraining said slidable frame in a position within the limits of the chassis, means opposing the operation of said spring means for projecting said slidable frame to a position beyond the limits of the chassis, said frame having a fixed depending end portion on the end thereof which is projectible beyond the limits of said chasis, a support carried by the depending end of said frame and spaced below said frame, and an auxiliary support hingedly connected with the depending end of said frame and disposed in operative position spaced below the first said support and movable to a stored position above said frame beyond the first said support.

6. A vehicle appliance comprising in combination with a vehicle chassis, a slidable frame horizontally supported with respect to the vehicle chassis, spring means normally restraining said slidable frame in a position within the limits of the chassis, means opposing the operation of said spring means for projecting said slidable frame to a position beyond the limits of the chassis, said frame having a fixed depending end portion on the end thereof which is projectible beyond the limits of said chassis, a support carried by said depending end and spaced below said slidable frame, an outer frame pivotally connected with the depending end of said slidable frame, a support carried by said last mentioned frame, outwardly extending limiting stops on the depending end of said slidable frame, and coacting abutments on the outer pivotally connected frame movable in the path of the limiting stops on the depending end of said slidable frame for limiting the movement of said pivotally connected frame with respect to said slidable frame.

7. A vehicle appliance comprising in combination with a vehicle chassis, a slidable frame supported with respect to the vehicle chassis and movable from a position within the limits of the vehicle chassis to a position beyond the limits of the vehicle chassis, said frame having a depending end portion, a support carried by said depending end portion, a hinged frame, a support carried by said hinged frame, means pivotally connecting said hinged frame with the depending end of said slidable frame, a resilient member carried by said slidable frame within the path of movement of said hinged frame for engaging said hinged frame when said hinged frame is moved from a lower limiting position to an upper limiting position.

8. A vehicle appliance comprising in combination with a vehicle chassis, a pair of spaced parallel rail members supported by the chassis, a slidable frame including a pair of side members slidably engaging said rail members, said slidable frame having a depending end portion, a support carried by said depending end portion, a hinged frame pivotally connected with said depending end portion, a support carried by said hinged frame and movable from an effective position below said first mentioned support to a stored position above said first mentioned support, and means carried by said slidable frame and engageable with one of said rail members for maintaining said slidable frame either in a position within the limits of the chassis or in a position beyond the limits of the chassis.

9. A vehicle appliance comprising in combination with a vehicle chassis, a pair of spaced parallel rail members supported by the chassis, a slidable frame including a pair of side members slidably engaging said rail members, said slidable frame having a depending end portion, a support carried by said depending end portion, a lever member pivotally connected with one of the side members of said slidable frame, a manual control means on one end of said lever member, a latch on the other end of said lever member, the said side member being slotted for the passage of the latch on the end of said lever member and being registerable with spaced coacting slots in the rail member engaged by the said side member, spring means supported by said last mentioned rail member and yieldably engaging said lever member for continuously urging the latch on said lever member through the slot in the said last mentioned side member, and into either of the slots in the coacting rail member for maintaining said slidable frame in a position within the limits of said chassis or in a position beyond the limits of said chassis, the manual control means on one end of said lever member being operative for shifting said latch out of engagement with one of the slots in the said coacting rail member for restoring said slidable frame to a position within the limits of said chassis.

10. A vehicle appliance comprising in combination with a vehicle chassis, a pair of rails horizontally supported by said chassis, a slidable frame longitudinally movable on said rails between positions within the limits of the chassis and beyond the limits of the chassis, spring means for normally restraining said slidable frame to a position within the limits of the chassis, manually controlled means controllable from a position within the vehicle for projecting said slidable frame to a position beyond the limits of the vehicle chassis, and a two position latch controllable from without said vehicle for latching said slidable frame in either of the extreme limiting positions thereof with said spring means tensioned.

11. A vehicle appliance comprising in combination with a vehicle chassis, a pair of rails supported by said chassis, a slidable frame longitudinally movable on said rails between positions within the limits of the chassis and beyond the limits of the chassis, spring means for normally restraining said slidable frame to a position within the limits of the chassis, manually controlled means controllable from a position within the vehicle for projecting said slidable frame to a position beyond the limits of the vehicle chassis, a manually operative lever member carried by said slidable frame, a latch device controlled by said lever member, means continuously tensioning said latch device whereby said latch device engages one of said rails in either of the extreme limits of movement of said slidable frame.

RAYMOND J. KELBERER.